(No Model.)
L. H. SNYDER.
FLOOR AND CEILING PLATE.
No. 547,160. Patented Oct. 1, 1895.
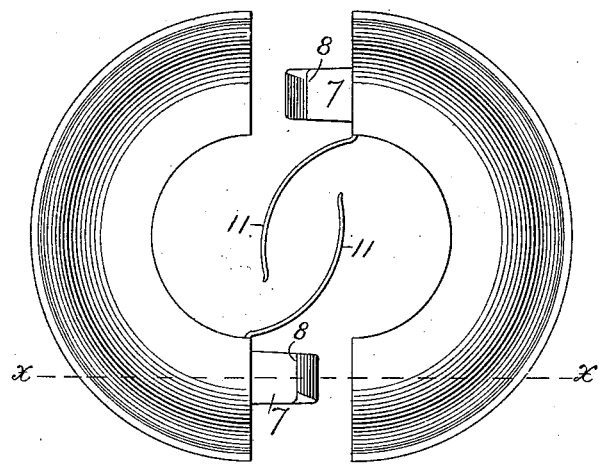
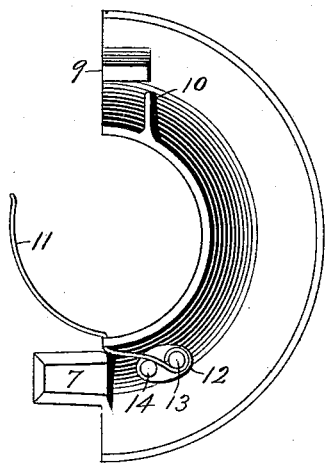
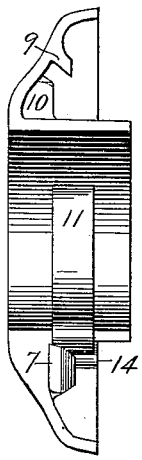
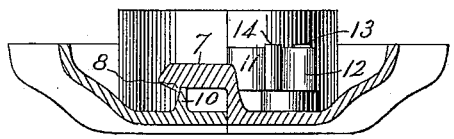
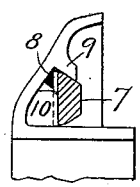
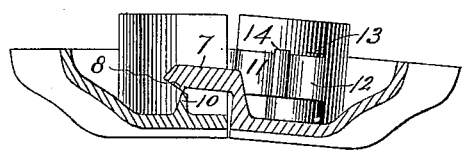
Witnesses
Inventor
Lyman H. Snyder
By James Shepard
Atty.

United States Patent Office.

LYMAN H. SNYDER, OF SOUTHINGTON, CONNECTICUT.

FLOOR AND CEILING PLATE.

SPECIFICATION forming part of Letters Patent No. 547,160, dated October 1, 1895.

Application filed April 11, 1895. Serial No. 545,281. (No model.)

*To all whom it may concern:*

Be it known that I, LYMAN H. SNYDER, a citizen of the United States, residing at Southington, in the county of Hartford and State of Connecticut, have invented certain new and useful Improvements in Floor and Ceiling Plates, of which the following is a specification.

My invention relates to improvements in floor and ceiling plates; and the objects of my improvements are simplicity and cheapness of construction and general efficiency and convenience of the article.

In the accompanying drawings, Figure 1 is a plan or face view of my plate with the parts slightly separated. Fig. 2 is a view showing the reverse side of one of said parts. Fig. 3 is an edge view of the same, showing the inner side. Fig. 4 is a sectional view of both parts together on a plane indicated by the line $x\ x$ of Fig. 1. Fig. 5 is a like view of the same with one of the plates tipped a little for detaching, and Fig. 6 is an edge view of a portion of one part with a transverse section of the tongue of the companion part.

My ceiling-plate differs from most or all prior separable plates in the fact that both parts are alike and may be cast from the same pattern. Each plate is of a semiannular form, of which the ends form the confronting faces of the two parts. One end is provided with a projecting tongue 7, beveled on its outer edge on one side and at its end, as shown. It is also provided with a transverse ledge or hook 8 near its outer end on that side which stands toward the face side of the plate. The other end of the plate is provided with an undercut ledge 9 to fit the beveled outer edge of the tongue, and also with a ridge or inward projection 10 for engagement of the transverse hook on the tongue. The main body of each plate is of an ordinary and well-known form. Plates of this kind are ordinarily provided with friction-springs to make them stay in their position on the pipe, especially when used as a ceiling or overhead plate, and my plate may be provided with any of the ordinary forms of springs or may be used without any springs at all. I prefer, however, to employ the spring 11, which projects from one inner corner of one part and extends around approximately toward the other inner corner, so that one spring and one part of the plate alone will encircle the pipe sufficiently to embrace it, the spring bearing upon one side of the pipe and the half-plate upon the other side. These springs thus projecting may be secured in any ordinary manner; but I prefer to let them pass over the end of the plate to the inside and there secure them in place by slipping their coiled end 12 upon a pin or post 13, while the shank of the spring between said post and end of the plate presses firmly against the side of another pin or post 14, as shown, so that after the spring is formed it can be secured by merely crowding it into place.

In order to assemble the parts when they have springs, first crowd one part and its spring over the pipe, then the other part with its spring. Then bring the two parts into the same plane, pulling upon the springs to separate the two parts sufficiently to insert the tongues 7 of each part under the under-cut ledges 9 of the other part, and let them come together under the force of the springs. The forward beveled ends of the tongues will now be in engagement with the ridges or projections 10. It is then only necessary to press the parts together with considerable force when the tongues will spring or give a trifle and let the hooks 8 pass over said ridges, after which the hooks will snap down into place and hold the two parts of the plate from accidental separation. In addition to this the peculiar arrangement of the springs before described will also have a tendency to hold the parts against separation.

In order to detach the two parts, it is best to first rock or tip one part a little away from the ceiling or floor, as the right-hand part is shown tipped in Fig. 5, which tipping will lift the hooks from their engagement with the ridges and permit the tongues to be withdrawn.

In prior plates having springs that bear upon one side of the pipe only the springs have a tendency to force the half-plates apart. By my invention springs which bear upon one side of the pipe only have the tendency to draw the half-plates together. The locking devices are very cheap and simple, are easily engaged by a straight inward movement, and are readily disengaged by a slight tipping of one part.

I claim as my invention—

1. A floor and ceiling plate comprising two separable parts each part provided at one end with a transverse hook and at the other end with an under cut ledge to receive one edge of said hook and also a ridge or shoulder 10 for the hook to engage, substantially as described and for the purpose specified.

2. A floor and ceiling plate comprising two separable parts, the confronting portions of which are provided with interlocking devices, and springs 11 arranged one on each part to project therefrom and return for facing the pipe receiving portion of said part, whereby said spring will bear upon one side of the pipe and the part of the plate to which that particular spring is secured will bear upon the opposite side of the pipe and the two springs act to draw said two parts together substantially as described.

3. A floor and ceiling plate comprising two separable parts having interlocking devices at their ends and spring holding pins or posts in the space inside of its floor or ceiling flange, and springs secured to said spring holding pins or posts and extending across one end of each part and outwardly therefrom, substantially as described and for the purpose specified.

4. As a new article of manufacture, a floor and ceiling plate comprising the semi-circular plate, provided at one end with a transverse hook and projecting spring, and at the other end with an under cut ledge and ridge or shoulder 10, substantially as described and for the purpose specified.

LYMAN H. SNYDER.

Witnesses.
MARCUS H. HOLCOMB,
THOMAS F. WELCH.